United States Patent
Jung et al.

(10) Patent No.: US 9,829,732 B2
(45) Date of Patent: Nov. 28, 2017

(54) BOTTOM CHASSIS AND METHOD OF MANUFACTURING THE SAME

(71) Applicant: Samsung Display Co., Ltd., Yongin, Gyeonggi-Do (KR)

(72) Inventors: Tai-Yun Jung, Pyeongtaek-si (KR); Ki-Hwan Baek, Asan-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 76 days.

(21) Appl. No.: 14/599,658

(22) Filed: Jan. 19, 2015

(65) Prior Publication Data

US 2015/0296640 A1 Oct. 15, 2015

(30) Foreign Application Priority Data

Apr. 9, 2014 (KR) .................... 10-2014-0042455

(51) Int. Cl.
*G02F 1/1333* (2006.01)
*H04N 5/64* (2006.01)
*G06F 1/16* (2006.01)

(52) U.S. Cl.
CPC .......... *G02F 1/133308* (2013.01); *G06F 1/16* (2013.01); *H04N 5/64* (2013.01); *G02F 2001/133314* (2013.01); *G02F 2001/133328* (2013.01)

(58) Field of Classification Search
CPC ... G02F 2001/133328; G02F 1/133308; G02F 2001/133314; G02F 2001/133325; G02F 2001/133322
See application file for complete search history.

(56) References Cited

U.S. PATENT DOCUMENTS

| | | | |
|---|---|---|---|
| 8,197,114 B2 | 6/2012 | Takata | |
| 2005/0168954 A1* | 8/2005 | Kim | G02F 1/133308 361/725 |
| 2008/0273136 A1* | 11/2008 | Hisada | G02F 1/133308 349/58 |
| 2010/0033648 A1 | 2/2010 | Kaganezawa | |
| 2013/0242608 A1* | 9/2013 | Chen | G09F 13/18 362/611 |
| 2013/0321740 A1* | 12/2013 | An | H05K 5/0217 349/58 |
| 2014/0125913 A1* | 5/2014 | Lee | G02F 1/133615 349/58 |

FOREIGN PATENT DOCUMENTS

| | | |
|---|---|---|
| JP | 2002-328353 A | 11/2002 |
| JP | 2006-106079 A | 4/2006 |
| JP | 2007-242107 A | 10/2007 |
| JP | 2008-304535 A | 12/2008 |
| JP | 2009-086560 A | 4/2009 |
| JP | 2010-002487 A | 1/2010 |
| JP | 5094250 B2 | 9/2012 |
| KR | 1020120052766 A | 5/2012 |

* cited by examiner

Primary Examiner — Jessica M Merlin
(74) Attorney, Agent, or Firm — Cantor Colburn LLP

(57) ABSTRACT

A manufacturing method of a bottom chassis includes providing a base plate having a flexibility and a first rigidity through a press molding process, providing a bent-maintaining member having a second rigidity greater than the first rigidity and being curved in a first direction through an extrusion molding process, and coupling the base plate to the bent-maintaining member.

21 Claims, 9 Drawing Sheets

BOTTOM CHASSIS AND METHOD OF MANUFACTURING THE SAME

This application claims priority to Korean Patent Application No. 10-2014-0042455, filed on Apr. 9, 2014, and all the benefits accruing therefrom under 35 U.S.C. §119, the contents of which are hereby incorporated by reference in its entirety.

BACKGROUND

1. Field

The present disclosure relates to a bottom chassis and a method of manufacturing the same. More particularly, the present disclosure relates to a bottom chassis having a curved shape and a method of manufacturing the bottom chassis.

2. Description of the Related Art

A display apparatus is used to display an image in various electronic equipment, such as a smart phone, a digital camera, a notebook computer, a navigation system, a smart television set, etc.

In recent years, a curved display device has been developed. The curved display device generally includes a curved display area to provide a user with the image having improved three-dimensional effect, immersiveness, and virtual presence.

SUMMARY

The present disclosure provides a bottom chassis having improved rigidity.

The present disclosure provides a method of manufacturing the bottom chassis in order to reduce a molding cost and improve reliability of the bottom chassis.

Exemplary embodiments of the invention provide a bottom chassis including a base plate having a flexibility and a first rigidity and being curved along a first direction and a bent-maintaining member which has a plurality of chassis bars coupled to the base plate, and maintains a curved shape of the base plate, the plurality of chassis bars having a second rigidity greater than the first rigidity, and being curved along the first direction. Each of the plurality of chassis bars is coupled to an adjacent chassis bar thereto.

In an exemplary embodiment, the base plate may include a bottom portion including first and second sides facing each other and the first and second sides extending substantially in parallel to the first direction. The bent-maintaining member may include a first bent-maintaining member including first chassis bars of the plurality of chassis bars disposed adjacent to the first side and coupled to the bottom portion among the chassis bars and a second bent-maintaining member including second chassis bars of the plurality of chassis bars disposed adjacent to the second side and coupled to the bottom portion among the chassis bars.

In an exemplary embodiment, the bottom portion may further include third and fourth sides extending in a second direction different from the first direction and substantially parallel to each other, the base plate may include first and second sidewalls respectively extending upward from the third and fourth sides, and the third and fourth sides may connect the first and second sides to each other.

In an exemplary embodiment, both ends of each of the first and second bent-maintaining members may be coupled to the first and second sidewalls, respectively.

In an exemplary embodiment, each of the first and second bent-maintaining members may include a first side chassis bar disposed adjacent to the first sidewall and a second side chassis bar disposed adjacent to the second sidewall, one end of the first side chassis bar is coupled to the first sidewall by a first fixing member, an end of the first side chassis bar opposing the one end thereof is coupled to an adjacent first chassis bar of the first chassis bars, one end of the second side chassis bar is coupled to the second sidewall by a second fixing member, and an end of the second side chassis bar opposing the one end thereof is coupled to an adjacent second chassis bar of the second chassis bars.

In an exemplary embodiment, each of the plurality of chassis bars may include a body part, a first coupling plate protruded outward from one end of the body part, and a second coupling plate protruded outward from an end of the body part opposing the one end thereof. The first coupling plate of each of the plurality of chassis bars is coupled to the second coupling plate of the adjacent chassis bar thereto.

In an exemplary embodiment, an upper surface of the first coupling plate may extend from an upper surface of the body part, a lower surface of the second coupling plate extends from a lower surface of the body part, the first and second coupling plates have thicknesses, respectively, which are smaller than a thickness of the body part, and a sum of the thickness of the first coupling plate and the thickness of the second coupling plate is equal to the thickness of the body part.

In an exemplary embodiment, the bottom chassis may further include a fixing member that connects the adjacent chassis bars to each other and fixing the coupled chassis bars to the base plate.

In an exemplary embodiment, first and second holes may be defined through the first and second plates, a third hole may be defined through the base plate, and the fixing member includes a screw engaged with the first, second, and third holes.

In an exemplary embodiment, each of the plurality of chassis bar may include a body part, a coupling block protruded outward from one end of the body part, and a coupling groove defined at an end of the body part opposing the one end thereof and having a shape corresponding to a shape of the coupling block. The coupling block of each of the plurality of chassis bars is coupled to the coupling groove of the adjacent chassis bar thereto.

In an exemplary embodiment, the coupling block may include a first coupling protruding part extending in the first direction from the body part and a second coupling protruding part extending in a direction different from the first direction from an end of the first coupling protruding part. The coupling groove includes a first coupling groove portion having a shape corresponding to the first coupling protruding part and a second coupling groove portion having a shape corresponding to the second coupling protruding part.

In an exemplary embodiment, the bottom chassis may further include a fixing member that connects the adjacent chassis bars to each other and fixes the coupled chassis bars to the base plate.

In an exemplary embodiment, a first hole may be defined through the first coupling protruding part, a second hole may be defined through the end of the body part opposing the one end thereof, a third hole may be defined through the base plate, and the fixing member may include a screw engaged with the first, second, and third holes.

Exemplary embodiments of the invention provide a method of manufacturing a bottom chassis including providing a base plate having a flexibility and a first rigidity through a press molding process, providing a bent-maintaining member having a second rigidity greater than the first rigidity and being curved in a first direction through an extrusion molding process, and coupling the base plate to the bent-maintaining member.

In an exemplary embodiment, the providing the bent-maintaining member may include providing an extrusion plate through the extrusion molding process to curve the extrusion plate in the first direction, cutting the extrusion plate along the first direction to provide a plurality of chassis bars, and coupling the plurality of chassis bars to each other.

In an exemplary embodiment, the extrusion plate may be extruded in a second direction substantially perpendicular to the first direction.

In an exemplary embodiment, the extrusion plate may include first and second plate sides substantially in parallel to the second direction and the first and second plate sides include first and second coupling patterns, respectively.

In an exemplary embodiment, the base plate may include first and second sides facing each other and extending substantially in parallel to the first direction. The bent-maintaining member includes a first bent-maintaining member disposed adjacent to and coupled to the first side and a second bent-maintaining member disposed adjacent to and coupled to the second side.

In an exemplary embodiment, the base plate may further include third and fourth sides extending substantially in parallel to the second direction and first and second sidewalls respectively extending upward from the third and fourth sides. The third and fourth sides connect the first and second sides to each other.

In an exemplary embodiment, both ends of each of the first and second bent-maintaining members may be coupled to the first and second sidewalls, respectively.

According to the above, since the chassis bars, which are provided by the extrusion molding process to have the relatively strong rigidity, are coupled to the base plate, the rigidity of the bottom chassis is improved. The chassis bars maintain the curved shape of the base plate. Therefore, the base plate does not need to have the curved shape when initially provided, and thus the manufacturing cost of the base plate is reduced and the reliability of the base plate is improved. In addition, the bent-maintaining member is provided by coupling the chassis bars to each other, and thus the bent-maintaining member may be applied to the display device having various sizes.

BRIEF DESCRIPTION OF THE DRAWINGS

The above and other advantages of the present disclosure will become readily apparent by reference to the following detailed description when considered in conjunction with the accompanying drawings, in which.

DETAILED DESCRIPTION

Figure 1:
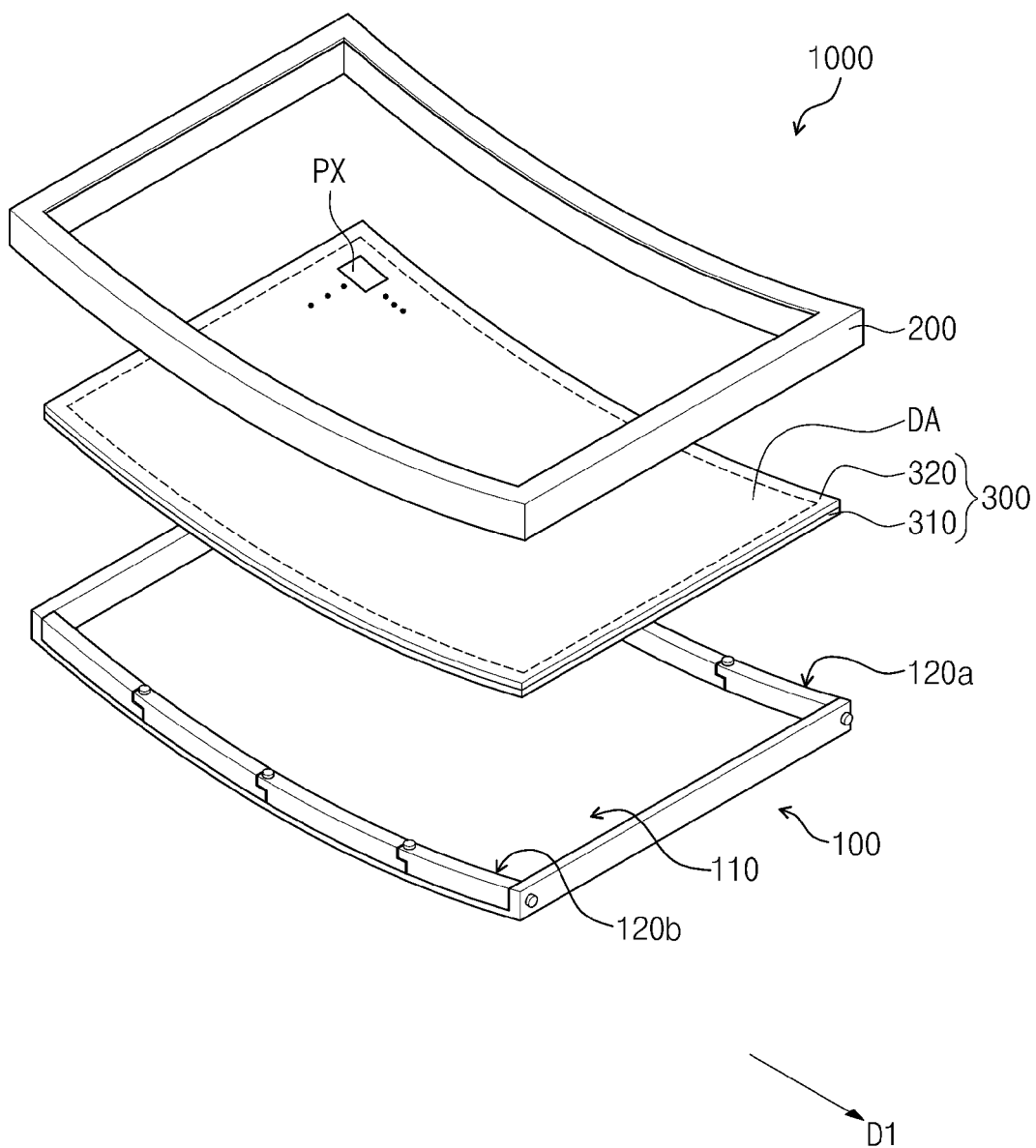
FIG. 1 is a perspective view showing an exemplary embodiment of a display device according to the present disclosure.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. In an exemplary embodiment, when the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the invention. As used herein, the singular forms, "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

FIG. 1 is a perspective view showing a display device 1000 according to an exemplary embodiment of the present disclosure.

Referring to FIG. 1, the display device 1000 includes a bottom chassis 100, a top chassis 200, and a display panel 300 interposed between the bottom chassis 100 and the top chassis 200.

The display device 1000 has a curved shape. In an exemplary embodiment, the display device 1000 is curved along a first direction D1, but it should not be limited thereto or thereby. That is, in other exemplary embodiment, the display device 1000 may be curved in various directions. The bottom chassis 100, the top chassis 200, and the display panel 300 may have the curved shape in the first direction D1.

The display panel 300 includes a display area DA in which an image is displayed. The display area DA is curved to correspond to the display panel 300, and thus the display area DA has the curved shape. Therefore, the display panel 300 may display the image having improved three-dimensional effect, immersiveness, and virtual presence using the display area DA having the curved shape.

The display panel 300 includes an array substrate 310, an opposite substrate 320, and a liquid crystal layer (not shown). The opposite substrate 320 faces the array substrate 310 while being coupled to the array substrate 310, and the liquid crystal layer is interposed between the array substrate 310 and the opposite substrate 320. A whole or a portion of the array substrate 310 has the curved shape along the first direction D1 and the opposite substrate 320 has the curved shape corresponding to that of the array substrate 310.

The display panel 300 includes a plurality of pixels PX arranged in a matrix form in the display area DA. Each pixel PX generates the image in response to a signal applied thereto.

In an exemplary embodiment, the display panel 300 may include various display panels such as an organic light emitting display panel, a liquid crystal display panel, a plasma display panel, an electrophoretic display panel, etc.

The top chassis 200 is disposed on the display panel 300 to protect the display panel 300 from external impacts. An opening which exposes the display area DA of the display panel 300 may be defined in the top chassis 200. The top chassis 200 is coupled to the bottom chassis 100 such that the display panel 300 is disposed between the bottom chassis 100 and the top chassis 200.

The bottom chassis 100 is disposed under the display panel 300 to accommodate the display panel 300 therein. The bottom chassis 100 includes a base plate 110 and first and second bent-maintaining members 120a and 120b, which are coupled to the base plate 110. The bottom chassis 100 provides a receiving space, which is defined by the base plate 110 and the first and second bent-maintaining members 120a and 120b, to accommodate the display panel 300.

Figure 2:
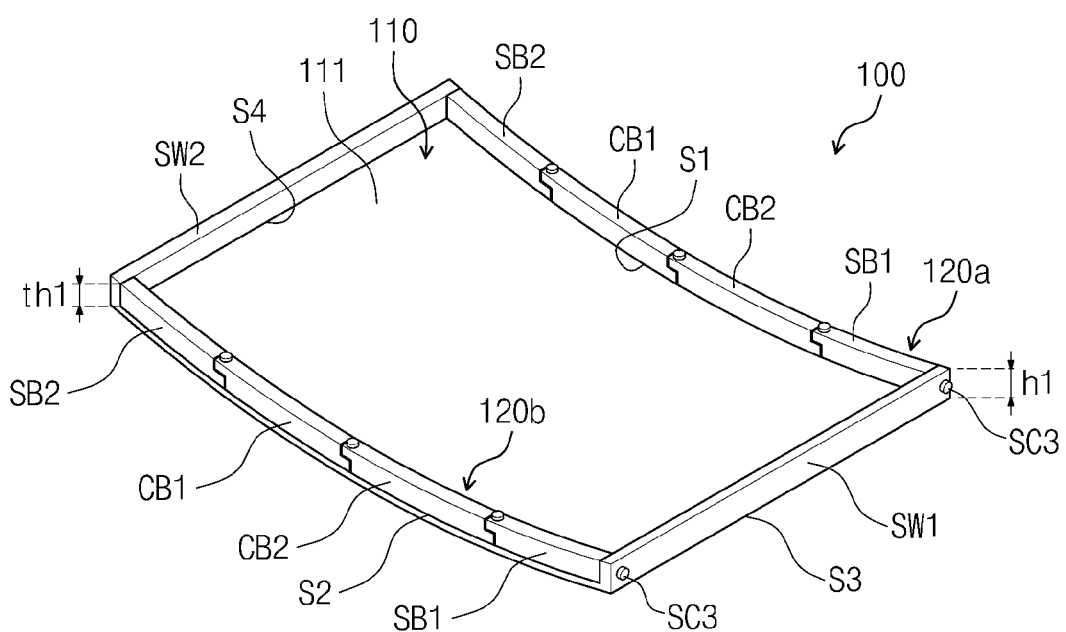
FIG. 2 is a perspective view showing a bottom chassis shown in FIG. 1.
Figure 2:
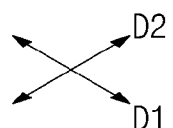

FIG. 2 is a perspective view showing the bottom chassis 100 shown in FIG. 1.

Referring to FIG. 2, the base plate 110 includes a bottom portion 111 and a sidewall extending upward from the bottom portion 111. The display panel 300 (refer to FIG. 1) is placed on the bottom portion 111. The bottom portion 111 has a shape corresponding to that of the display panel 300. In an exemplary embodiment, the bottom portion 111 has a rectangular shape, in a plan view, with two pairs of parallel sides, for example. In the illustrated exemplary embodiment, the bottom portion 111 includes a first side S1 extending substantially in parallel to the first direction D1 and a second side S2 facing the first side S1. In addition, the bottom portion 111 includes a third side S3 extending substantially in parallel to the second direction D2 different from the first direction D1 and a fourth side S4 facing the third side S3. In an exemplary embodiment, the second direction D2 may be substantially perpendicular to the first direction D1. The third and fourth sides S3 and S4 connect the first and second sides S1 and S2.

As described above, since the bottom chassis 100 has the curved shape along the first direction D1, the first and second sides S1 and S2 have the curved shape along the first direction D1. In more detail, the first and second sides S1 and S2 are convex-downward to have the curved shape. In an exemplary embodiment, the bottom chassis 100 is not curved in the second direction D2. That is, the third and fourth sides S3 and S4 are straight or linear in the second direction D2.

The third and fourth sidewalls S3 and S4 extend upward from the sides of the base plate 110, which are not curved. In the illustrated exemplary embodiment, the base plate 110 includes first and second sidewalls SW1 and SW2 respectively extending upward from the third and fourth sides S3 and S4 that extend straight or in a linear direction.

The first and second bent-maintaining members 120a and 120b are disposed respectively adjacent to the first and second sides S1 and S2 and coupled to the bottom portion 111 along the first direction D1. Each of the first and second bent-maintaining members 120a and 120b includes a first chassis bar CB1, a second chassis bar CB2, a first side chassis bar SB1, and a second side chassis bar SB2, which are coupled to the bottom portion 111. In the illustrated exemplary embodiment, each of the first and second bent-maintaining members 120a and 120b includes one first chassis bar CB1 and one second chassis bar CB2, but the number of the first and second chassis bars CB1 and CB2 should not be limited thereto or thereby. In another exemplary embodiment, each of the first and second bent-maintaining members 120a and 120b may include plural first chassis bars and plural second chassis bars, for example.

The first and second chassis bars CB1 and CB2 are disposed between the first and second side chassis bars SB1 and SB2. The first side chassis bar SB1 is disposed between the second chassis bar CB2 and the first sidewall SW1 and the second side chassis bar SB2 is disposed between the first chassis bar CB1 and the second sidewall SW2.

One end of the first chassis bar CB1 is coupled to one end of the second side chassis bar SB2 and the other end of the first chassis bar CB1 is coupled to one end of the second chassis bar CB2. The other end of the second chassis bar CB2 is coupled to one end of the first side chassis bar SB1.

One end of each of the first and second bent-maintaining members 120a and 120b is coupled to one end of the first sidewall SW1 and the other end of each of the first and second bent-maintaining members 120a and 120b is coupled to one end of the second sidewall SW2. In more detail, the other end of the first side chassis bar SB1 corresponding to the one end of each of the first and second bent-maintaining members 120a and 120b is coupled to the one end of the first sidewall SW1, and the other end of the second side chassis bar SB2 corresponding to the other end of each of the first and second bent-maintaining members 120a and 120b is coupled to the one end of the second sidewall SW2. In an exemplary embodiment, a third coupling screw SC3 may be engaged with the first sidewall SW1 and the first side chassis bar SB1.

The first and second sidewalls SW1 and SW2 have a first height h1 from an upper surface of the bottom portion 111. The first and second chassis bars CB1 and CB2 and the first and second side chassis bars SB1 and SB2 have a first thickness th1. In the illustrated exemplary embodiment, the first height h1 may be substantially the same as the first thickness th1, for example. The receiving space, in which the display panel 300 is accommodated, is defined by the first and second bent-maintaining members 120a and 120b and the first and second sidewalls SW1 and SW2.

The base plate 110 has flexibility and a first rigidity, and the first and second chassis bars CB1 and CB2 and the first and second side chassis bars SB1 and SB2 have a second rigidity greater than the first rigidity. Since the base plate 110 has the flexibility, the base plate 110 may be bent by external force. In an exemplary embodiment, the base plate 110 may include a metal plate having a thickness appropriate to have the flexibility, for example.

In an exemplary embodiment, the first and second chassis bars CB1 and CB2 and the first and second side chassis bars SB1 and SB2 include a material having no flexibility in order to maintain the shape of the base plate 110. That is, the first and second chassis bars CB1 and CB2 and the first and second side chassis bars SB1 and SB2 are not bent even though the external force is applied thereto. In an exemplary embodiment, the first and second chassis bars CB1 and CB2 and the first and second side chassis bars SB1 and SB2 may include a metal plate having a thickness inappropriate to have the flexibility. When a metal material is provided, a metal member provided by an extrusion molding process has the rigidity greater than that of a metal member provided by a press molding process. Accordingly, in an exemplary embodiment, the base plate 110 is provided by press-molding the metal material, and the first and second chassis bars CB1 and CB2 and the first and second side chassis bars SB1 and SB2 are provided by extrusion-molding the metal material.

As described above, since the first and second bent-maintaining members 120a and 120b, which are provided by the extrusion molding process and have the rigidity greater than that of the base plate 110, are coupled to the base plate 110, the rigidity of the bottom chassis 100 is improved.

A production cost of the base plate 110 when the base plate 110 is provided to have the curved shape is expensive compared to a production cost of the base plate 110 when the base plate 110 is provided to have a flat shape.

However, according to the exemplary embodiment, when the base plate 110 is coupled to the first and second bent-maintaining members 120a and 120b, the base plate 110 is bent to correspond to the shape of the first and second bent-maintaining members 120a and 120b even though the base plate 110 is provided to have the flat shape when initially provided. Therefore, the base plate 110 does not need to have the curved shape when initially provided. Thus, the base plate 110 may be provided to have the flat shape when initially provided, so that the production cost of the base plate 110 and the bottom chassis 100 may be reduced.

Figure 3:
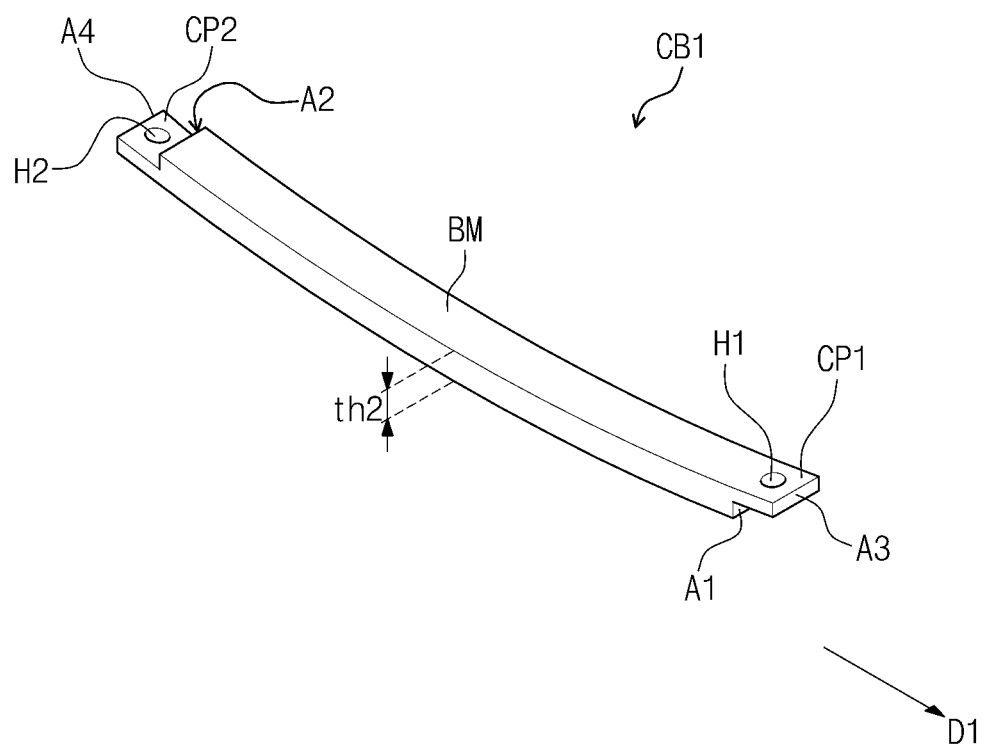
FIG. 3 is a perspective view showing a first chassis bar shown in FIG. 2.
Figure 4:
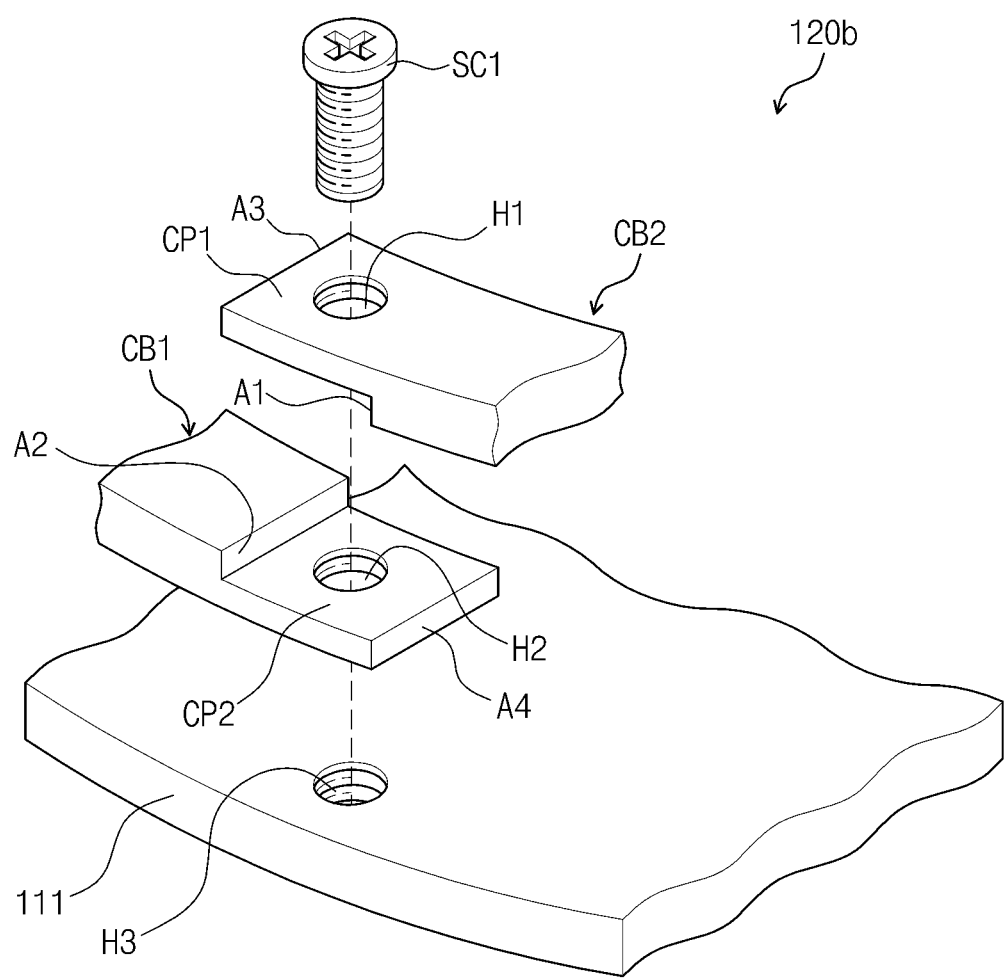
FIG. 4 is an enlarged perspective view showing a portion in which first and second chassis bars are coupled to the bottom chassis.

FIG. 3 is a perspective view showing the first chassis bar shown in FIG. 2, and FIG. 4 is an enlarged perspective view showing a portion in which the first and second chassis bars are coupled to the bottom chassis. Since the first and second chassis bars CB1 and CB2 have the same structure and function, hereinafter, only the first chassis bar CB1 will be described in detail.

Referring to FIGS. 3 and 4, the first chassis bar CB1 is curved along the first direction D1 and includes a body part BM, a first coupling plate CP1 provided at one end of the body part BM, and a second coupling plate CP2 provided at the other end of the body part BM.

The body part BM includes a first surface A1 disposed at the one end of the body part BM which connects a lower surface of the body part BM and a lower surface of the first coupling plate CP1, and a second surface A2 disposed at the other end of the body part BM to connect the upper surface of the body part BM and an upper surface of the second coupling plate CP2.

The first coupling plate CP1 is protruded outward from the first surface A1. In an exemplary embodiment, the first coupling plate CP1 has a thickness smaller than a thickness th2 of the body part BM. An upper surface of the first coupling plate CP1 extends from the upper surface of the body part BM in a direction substantially in parallel to the upper surface of the body part BM. The first coupling plate CP1 includes a third surface A3 substantially in parallel to the first surface A1 and connecting lower and upper surfaces of the first coupling plate CP1.

The second coupling plate CP2 is protruded outward from the second surface A2. In an exemplary embodiment, the second coupling plate CP2 has a thickness smaller than the thickness th2 of the body part BM. A lower surface of the second coupling plate CP2 extends from the lower surface of the body part BM. The second coupling plate CP2 includes a fourth surface A4 substantially in parallel to the second surface A2 and connecting lower and upper surfaces of the second coupling plate CP2.

The body part BM has a second thickness th2 equal to a sum of the thickness of the first coupling plate CP1 and the thickness of the second coupling plate CP2. In an exemplary embodiment, the thickness of each of the first and second coupling plates CP1 and CP2 is equal to a half of the thickness th2 of the body part BM, for example.

As shown in FIG. 4, the second coupling plate CP2 disposed at the other end of the first chassis bar CB1 is disposed to overlap with the first coupling plate CP1 disposed at the one end of the second chassis bar CB2 when viewed in a plan view. In this case, the lower surface of the first coupling plate CP1 of the second chassis bar CB2 makes contact with the upper surface of the second coupling plate CP2 of the first chassis bar CB1, the third surface A3 of the first coupling plate CP1 of the second chassis bar CB2 makes contact with the second surface A2 of the second chassis bar CB1, and the fourth surface A4 of the second coupling plate CP2 of the second chassis bar CB1 makes contact with the first surface A1 of the first chassis bar CB2.

The first and second chassis bars CB1 and CB2 are fixed to the base plate 110 using a fixing member. In an exemplary embodiment, the first and second chassis bars CB1 and CB2 are fixed to the base plate 110 by a first coupling screw SC1. In more detail, first and second holes H1 and H2 are defined in the first and second coupling plates CP1 and CP2 include, respectively, and a third hole H3 is defined in the bottom portion 111 to correspond to the first and second holes H1 and H2. The first coupling screw SC1 is engaged into the first to third holes H1 to H3. Accordingly, the first and second chassis bars CB1 and CB2 are coupled to each other by the first coupling screw SC1, and the first and second chassis bars CB1 and CB2 are fixed to the base plate 110 by the first coupling screw SC1.

As described above, since the first and second coupling plates CP1 and CP2 are partially overlapped with each other while being coupled to each other, the first and second chassis bars CB1 and CB2 are coupled to each other by the first and second coupling plates CP1 and CP2, and thus the first and second chassis bars CB1 and CB2 are prevented from being separated from each other in a direction substantially vertical to a longitudinal direction of the first and second chassis bars CB1 and CB2.

Figure 5:
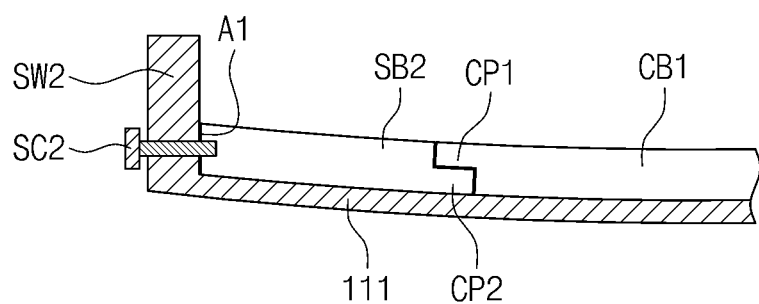
FIG. 5 is a cross-sectional view showing a portion in which a second side chassis bar is coupled to a second sidewall.
Figure 6:
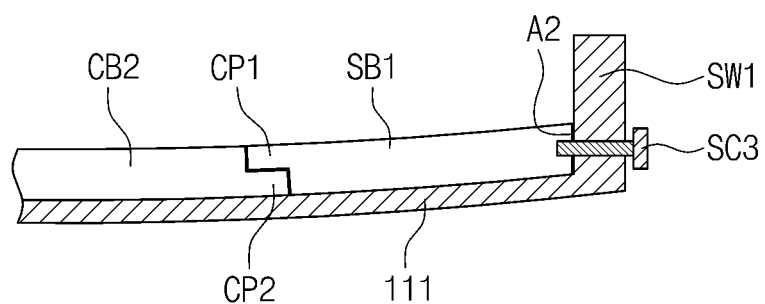
FIG. 6 is a cross-sectional view showing a portion in which a first side chassis bar is coupled to a first sidewall.

FIG. 5 is a cross-sectional view showing a portion in which the second side chassis bar is coupled to the second sidewall, and FIG. 6 is a cross-sectional view showing a portion in which the first side chassis bar is coupled to the first sidewall.

Referring to FIG. 5, the second side chassis bar SB2 has the same structure and function as those of the first chassis bar CB1 except that the second side chassis bar SB2 does not include the first coupling plate CP1 (refer to FIG. 3). That is, the second side chassis bar SB2 is configured to include the body part BM and the second coupling plate CP2.

The second coupling plate CP2 of the second side chassis bar SB2 is coupled to the first coupling plate CP1 of the first chassis bar CB1. The first surface A1 of the second side chassis bar SB2 makes contact with a surface of the second sidewall SW2, which faces the first surface A1. The second side chassis bar SB2 is coupled to the second sidewall SW2 by a fixing member. The fixing member may be a second coupling screw SC2 engaged with the second sidewall SW2 and the second side chassis bar SB2.

Referring to FIG. 6, the first side chassis bar SB1 has the same structure and function as those of the second chassis bar CB2 except that the first side chassis bar SB1 does not include the second coupling plate CP2 (refer to FIG. 3). That is, the first side chassis bar SB1 is configured to include the body part BM and the first coupling plate CP1.

The first coupling plate CP1 of the first side chassis bar SB1 is coupled to the second coupling plate CP2 of the second chassis bar CB2. The second surface A2 of the first side chassis bar SB1 makes contact with a surface of the first sidewall SW1, which faces the second surface A2. The first side chassis bar SB1 is coupled to the first sidewall SW1 by a fixing member. In an exemplary embodiment, the fixing member may be a third coupling screw SC3 engaged with the first sidewall SW1 and the first side chassis bar SB1.

As described above, the first and second bent-maintaining members 120a and 120b include the first and second chassis bars CB1 and CB2. Accordingly, although a size of the base plate 110 (refer to FIGS. 1 and 2) varies, the first and second bent-maintaining members 120a and 120b (refer to FIGS. 1 and 2) may be easily applied to the base plate 110 by adjusting the number of the first and second chassis bars CB1 and CB2 in accordance with the size of the base plate 110.

In particular, the first and second chassis bars CB1 and CB2 may not have a length longer than a specific length due to a limitation of equipment used to manufacture the first and second chassis bar CB1 and CB2 and the first and second side chassis bars SB1 and SB2. When the length of the base plate 110 is longer than the specific length, the first and second bent-maintaining members 120a and 120b may be manufactured to have the length corresponding to the length of the base plate 110 by using plural first chassis bars CB1 and plural second chassis bars CB2, and thus the first and second bent-maintaining members 120a and 120b may be coupled to the base plate 110.

Figure 7:
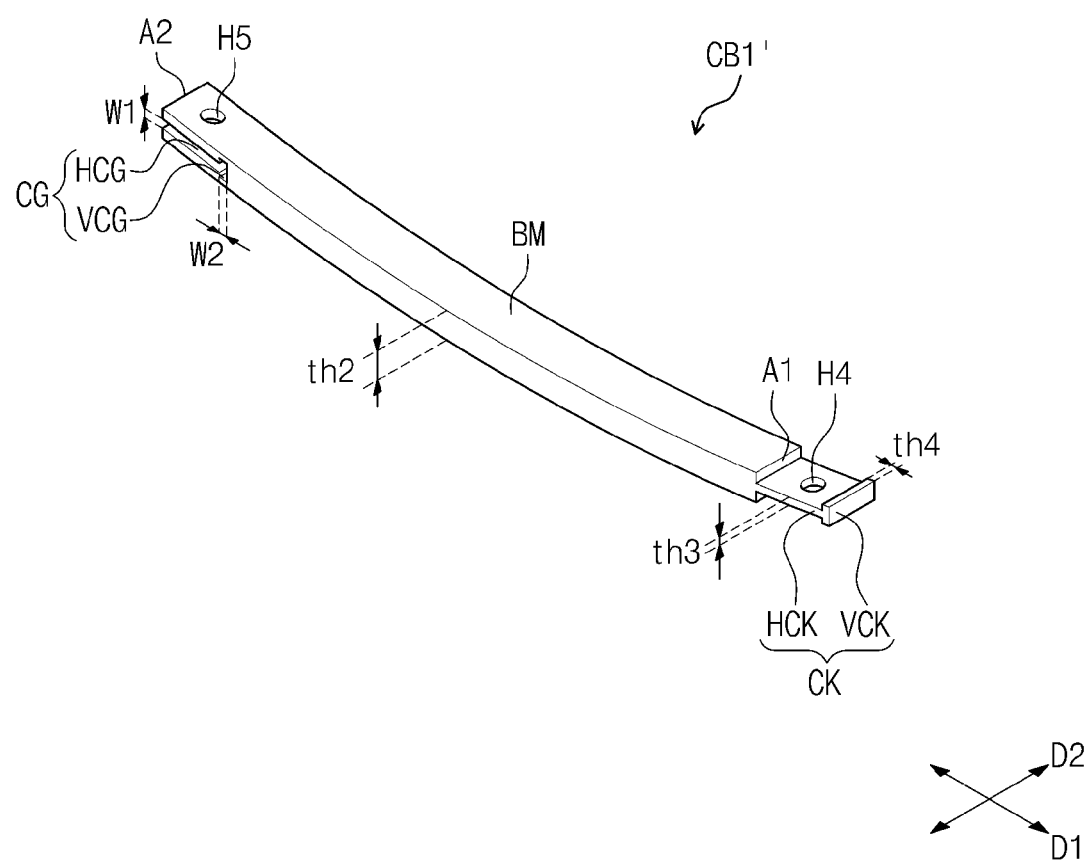
FIG. 7 is a perspective view showing another exemplary embodiment of a chassis bar according to the present disclosure.
Figure 8:
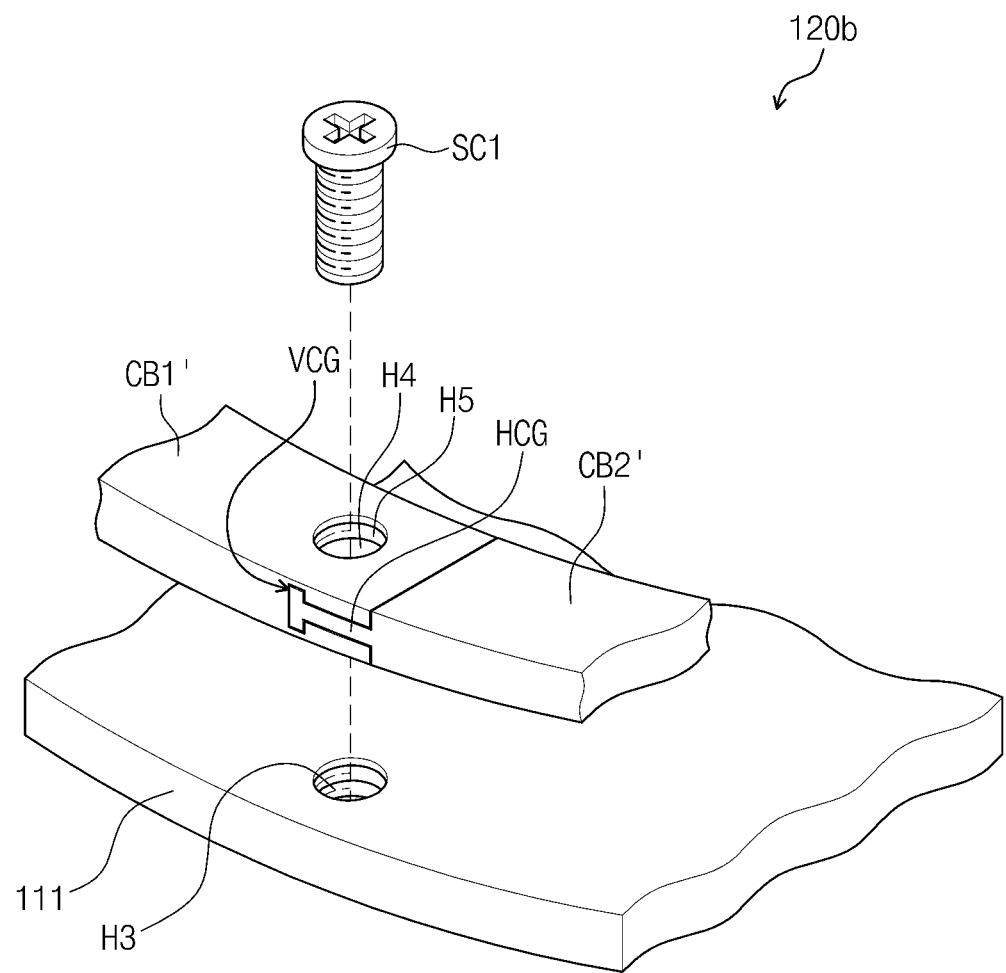
FIG. 8 is an enlarged perspective view showing a portion in which the chassis bar shown in FIG. 7 is coupled to the bottom chassis.

FIG. 7 is a perspective view showing a chassis bar according to another exemplary embodiment of the present disclosure and FIG. 8 is an enlarged perspective view showing a portion in which the chassis bar shown in FIG. 7 is coupled to the bottom chassis.

Referring to FIGS. 7 and 8, a first chassis bar CB1' includes a body part BM curved along the first direction D1, a coupling block CK disposed at one end of the body part BM, and a coupling groove CG defined in the other end of the body part BM.

The body part BM includes a first surface A1 disposed at the one end thereof to connect an upper surface of the body part BM and a lower surface of the body part BM, and a second surface A2 disposed at the other end thereof to connect the upper surface of the body part BM and the lower surface of the body part BM.

The coupling block CK includes a horizontal coupling protruding part HCK extending in a longitudinal direction of the body part BM from the first surface A1 and a vertical coupling protruding part VCK extending in a direction different from the longitudinal direction from an end of the horizontal coupling protruding part HCK. In the illustrated exemplary embodiment, the horizontal coupling protruding part HCK extends substantially in parallel to the first direction D1 and the vertical coupling protruding part VCK extends substantially in parallel to the second direction D2 vertical to the first direction D1.

The horizontal coupling protruding part HCK has a plate-like shape in a plan view with the same width as that of the body part BM. In the illustrated exemplary embodiment, a side surface of the horizontal coupling protruding part HCK extends from the side surface of the body part BM and is substantially in parallel to the side surface of the body part BM. The horizontal coupling protruding part HCK has a third thickness th3 smaller than the second thickness th2 of the body part BM.

The vertical coupling protruding part VCK has a plate-like shape in a side view with the same width as that of the body part BM and the horizontal coupling protruding part HCK. In the illustrated exemplary embodiment, a side surface of the vertical coupling protruding part VCK extends from the side surface of the horizontal coupling protruding part HCK and is substantially in parallel to the side surface of the horizontal coupling protruding part HCK. The vertical coupling protruding part VCK has a fourth thickness th4 smaller than the second thickness th2 of the body part BM.

The side surface A2 of the other end of the body part BM is opened by the coupling groove CG along the second direction D2. The coupling groove CG includes a horizontal coupling groove portion HCG having a shape corresponding to the shape of the horizontal coupling protruding part HCK and a vertical coupling groove portion VCG having a shape corresponding to the vertical coupling protruding part VCK.

In more detail, the horizontal coupling groove portion HCG is recessed from the second surface A2 to the longitudinal direction of the body part BM. The horizontal coupling groove portion HCG has a first width W1 substantially the same as the third thickness th3 of the horizontal coupling protruding part HCK.

The vertical coupling groove portion VCG has substantially the same shape as that of the vertical coupling protruding part VCK. The vertical coupling groove portion VCG is connected to the end of the horizontal coupling groove portion HCG and extends in the second direction D2. The vertical coupling groove portion VCG has a second width W2 substantially the same as the fourth thickness th4 of the vertical coupling protruding part VCK.

Referring to FIG. 8, the second bent-maintaining member 120b includes first and second chassis bars CB1' and CB2' coupled to each other. The second chassis bar CB2' has the same structure and function as those of the first chassis bar CB1', and thus detailed description of the second chassis bar CB2' will be omitted. The coupling groove CG defined at the other end of the first chassis bar CB1' is overlapped with the coupling block CK disposed at one end of the second chassis bar CB2' when viewed in a plan view.

As described above, since the horizontal coupling groove portion HCG has the shape corresponding to that of the horizontal coupling protruding part HCK and the vertical coupling groove portion VCG has the shape corresponding to that of the vertical coupling protruding part VCK, the horizontal coupling protruding part HCK and the vertical coupling protruding part VCK may be coupled to the horizontal coupling groove portion HCG and the vertical coupling groove portion VCG, respectively. Therefore, the first and second chassis bars CB1' and CB2' are coupled to each other by the vertical coupling groove portion VCG and the vertical coupling protruding part VCK, and thus the first and second chassis bars CB1' and CB2' are prevented from being separated from each other in the first direction D1. In addition, the first and second chassis bars CB1' and CB2' are coupled to each other by the horizontal coupling groove portion HCG and the horizontal coupling protruding part HCK, so that the first and second chassis bars CB1' and CB2' are prevented from being separated from each other in the second direction D2.

The first and second chassis bars CB1' and CB2' are fixed to the base plate 110 by a fixing member. In an exemplary embodiment, the first and second chassis bars CB1' and CB2' are fixed to the base plate 110 by a first coupling screw SC1. In more detail, a fourth hole H4 is defined in the horizontal coupling protruding part HCK, a fifth hole H5 is defined through the other end of the second chassis bar CB2', the third hole H3 is defined in the base plate 110.

The first coupling screw SC1 is engaged with the third, fourth, and fifth holes H3, H4, and H5. Thus, the first and second chassis bars CB1' and CB2' are coupled to each other by the first coupling screw SC1 and fixed to the base plate 110 by the first coupling screw SC1.

FIGS. 9A to 9D are perspective views showing a method of manufacturing the bottom chassis according to an exemplary embodiment of the present disclosure.

Figure 9A:
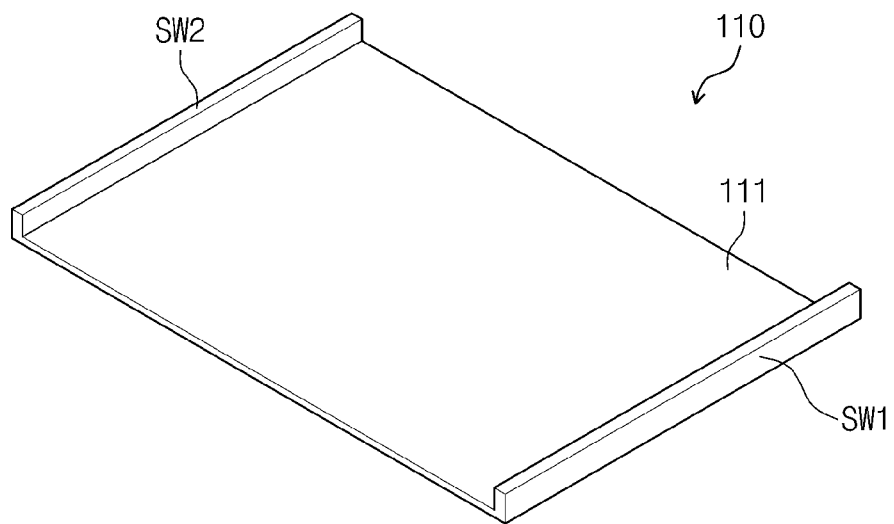
FIGS. 9A to 9D are perspective views showing an exemplary embodiment of a method of manufacturing a bottom chassis according to the present disclosure.

Referring to FIG. 9A, in an exemplary embodiment, the base plate 110 including the bottom portion 111 and the first and second sidewalls SW1 and SW2 is provided by the press molding process, for example. The bottom portion 111 has the flat shape without being curved. In general, when an object is provided by the press molding process to be curved, the molding cost of the press molding process performed on the object increases and reliability on the press molding process is hardly guaranteed. However, according to the exemplary embodiment, since the bottom portion 111 is provided to have the flat shape when initially provided, the molding cost of the press molding process may be reduced and the reliability of the press molding process may be improved. In an exemplary embodiment, the base plate 110 may be provided by press-molding a metal material, e.g., aluminum.

Figure 9B:
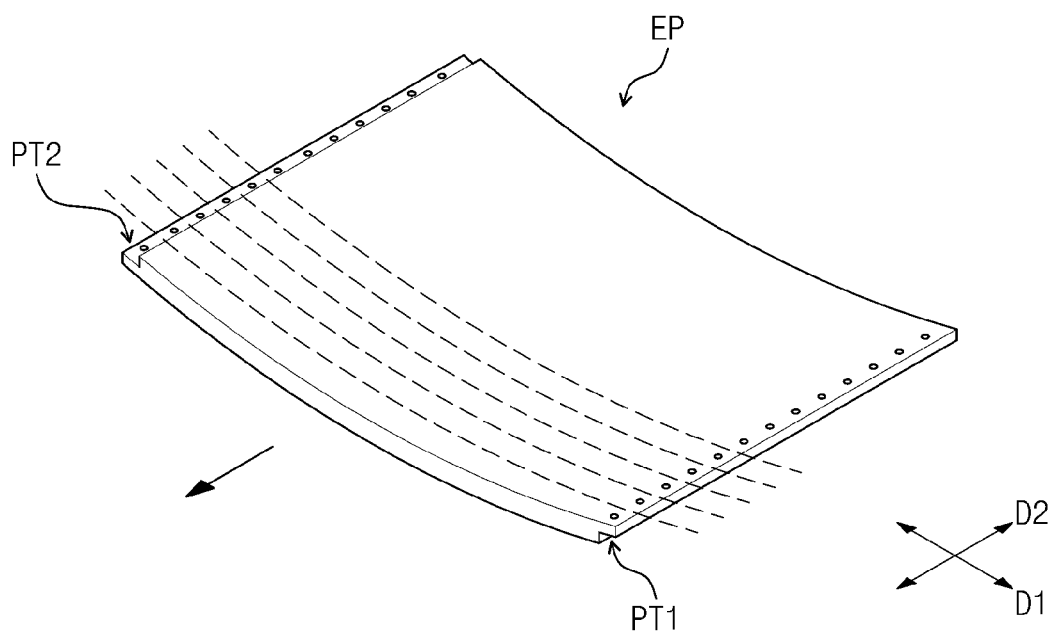

Referring to FIG. 9B, an extrusion plate EP is provided by the extrusion molding process. The extrusion plate EP is provided by continuously extruding a material along the second direction D2. The extrusion plate EP has the shape curved along the first direction D1 substantially perpendicular to the second direction D2. The extrusion plate EP includes a first coupling pattern PT1 provided at a first plate side extending substantially in parallel to the second direction D2 and a second coupling pattern PT2 provided at a second plate side extending substantially in parallel to the second direction D2 and facing the first plate side.

Figure 9C:
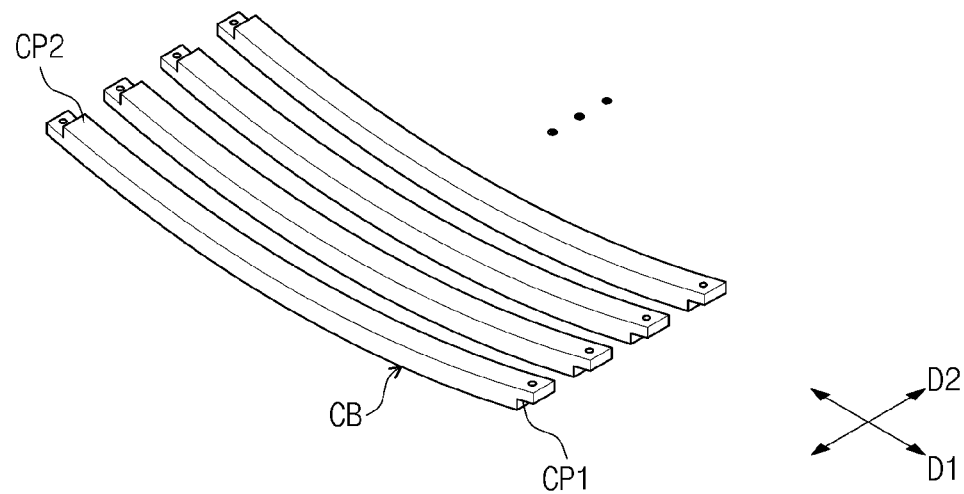

Referring to FIG. 9C, the extrusion plate EP is cut along the first direction D1 into plural chassis bars CB each having a constant width in the second direction D2. The chassis bars CB may be configured to include the first and second chassis bars CB1 and CB2. When the extrusion plate EP is cut as described above, the first and second coupling plates PT1 and PT2 may respectively serve as the first and second coupling plates CP1 and CP2 of the chassis bars CB.

Although not shown in figures, after the chassis bars CB are provided, the first and second side chassis bars SB1 and SB2 may be provided by removing the first and second coupling plates CP1 and CP2.

Figure 9D:
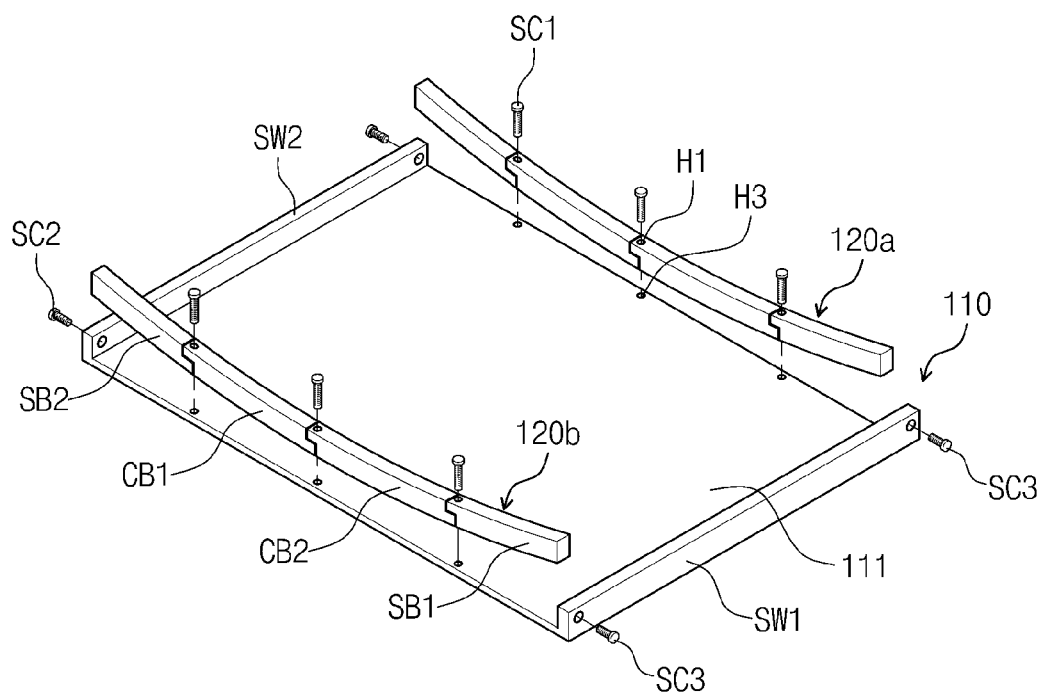

Then, as shown in FIG. 9D, the second side chassis bar SB2, the first chassis bar CB1, the second chassis bar CB2, and the first side chassis bar SB1 are connected to each other one after another, thus the first and second bent-maintaining members 120a and 120b are provided.

The first and second chassis bars CB1 and CB2 are aligned such that the first and second holes H1 and H2 (refer to FIG. 4) are overlapped with each other, and the first and second chassis bars CB1 and CB2 are disposed on the bottom portion 111 to allow the first and second holes H1 and H2 to overlap with the third hole H3 (refer to FIG. 4) of the bottom portion 111.

When the first coupling screw SC1 is coupled to the first to third holes H1 to H3, the chassis bars CB adjacent to each other are coupled to each other by the first coupling screw SC1 and the chassis bars CB are fixed to the bottom portion 111. The first sidewall SW1 is coupled to the first side chassis bar SB1 by the third coupling screw SC3 and the second sidewall SW2 is coupled to the second side chassis bar SB2 by the second coupling screw SC2.

The bottom portion 111 is curved along the first direction D1 to correspond to the shape of the chassis bars CB since the bottom portion 111 has the flexibility.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A bottom chassis comprising:
a base plate which has a flexibility and a first rigidity, includes a sidewall unitary therewith and extending substantially perpendicular thereto, and is curved along a first direction; and
a bent-maintaining member which comprises a plurality of chassis bars which has a second rigidity greater than the first rigidity, is curved along the first direction and coupled to the base plate, and maintains a curved shape of the base plate,
wherein each of the plurality of chassis bars is coupled to an adjacent chassis bar thereto, and
wherein at least one of the plurality of chassis bars is directly coupled to the sidewall of the base plate by a fixing member disposed in holes defined in the at least one of the plurality of chassis bars and the sidewall of the base plate.

2. The bottom chassis of claim 1, wherein
the base plate comprises a bottom portion comprising first and second sides which face each other and extend substantially parallel to the first direction, and
the bent-maintaining member further comprises:
a first bent-maintaining member comprising first chassis bars of the plurality of chassis bars disposed adjacent to the first side and coupled to the bottom portion; and
a second bent-maintaining member comprising second chassis bars of the plurality of chassis bars disposed adjacent to the second side and coupled to the bottom portion.

3. The bottom chassis of claim 2, wherein
the bottom portion further comprises third and fourth sides extending in a second direction different from the first direction and substantially parallel to each other,
the sidewall comprises first and second sidewalls respectively extending upward from the third and fourth sides, and
the third and fourth sides connect the first and second sides to each other.

4. The bottom chassis of claim 3, wherein both ends of each of the first and second bent-maintaining members are coupled to the first and second sidewalls, respectively.

5. The bottom chassis of claim 4, wherein
each of the first and second bent-maintaining members further comprises a first side chassis bar disposed adjacent to the first sidewall and a second side chassis bar disposed adjacent to the second sidewall,
one end of the first side chassis bar is coupled to the first sidewall by a first fixing member, and an end of the first side chassis bar opposing the one end thereof is coupled to an adjacent first chassis bar of the first chassis bars, and
one end of the second side chassis bar is coupled to the second sidewall by a second fixing member, and an end of the second side chassis bar opposing the one end thereof is coupled to an adjacent second chassis bar of the second chassis bars.

6. The bottom chassis of claim 1, wherein each of the plurality of chassis bars comprises:
a body part,
a first coupling plate protruded outward from one end of the body part, and
a second coupling plate protruded outward from an end of the body part opposing the one end thereof,
wherein the first coupling plate of each of the plurality of chassis bars is coupled to the second coupling plate of the adjacent chassis bar.

7. The bottom chassis of claim 6, wherein
an upper surface of the first coupling plate extends from an upper surface of the body part,
a lower surface of the second coupling plate extends from a lower surface of the body part,
the first and second coupling plates have thicknesses, respectively, which are smaller than a thickness of the body part, and
a sum of the thickness of the first coupling plate and the thickness of the second coupling plate is equal to the thickness of the body part.

8. The bottom chassis of claim 7, wherein the fixing member which connects adjacent chassis bars of the plurality of chassis bars to each other.

9. The bottom chassis of claim 8, wherein
first and second holes are respectively defined through the first and second coupling plates,
a third hole is defined through the base plate, and
the fixing member includes a screw engaged with the first, second and third holes.

10. The bottom chassis of claim 1, wherein each of the plurality of chassis bars comprises:
a body part,
a coupling block protruded outward from one end of the body part, and
a coupling groove defined at an end of the body part opposing the one end thereof, and having a shape corresponding to a shape of the coupling block,
wherein the coupling block of each of the plurality of chassis bars is coupled to the coupling groove of the adjacent chassis bar.

11. The bottom chassis of claim 10, wherein
the coupling block comprises:
a first coupling protruding part extending in the first direction from the body part; and
a second coupling protruding part extending in a direction different from the first direction from an end of the first coupling protruding part, and
the coupling groove comprises:
a first coupling groove portion having a shape corresponding to the first coupling protruding part; and
a second coupling groove portion having a shape corresponding to the second coupling protruding part.

12. The bottom chassis of claim 11, further comprising a fixing member which connects adjacent chassis bars of the plurality of chassis bars to each other and fixes the coupled chassis bars to the base plate.

13. The bottom chassis of claim 12, wherein
a first hole is defined through the first coupling protruding part,
a second hole is defined through the end of the body part opposing the one end thereof,
a third hole defined through the base plate, and
the fixing member includes a screw engaged with the first, second and third holes.

14. A method of manufacturing a bottom chassis, comprising:
providing a base plate having a flexibility and a first rigidity and including a sidewall unitary therewith and extending substantially perpendicular thereto, through a press molding process;
providing a bent-maintaining member including a plurality of chassis bars having a second rigidity greater than the first rigidity and being curved in a first direction, through an extrusion molding process; and
coupling the base plate to the bent-maintaining member, wherein
at least one of the plurality of chassis bars is directly coupled to the side wall of the base plate by a fixing member disposed in holes defined in the at least one of the plurality of chassis bars and the sidewall of the base plate.

15. The method of claim 14, wherein the providing the bent-maintaining member further comprises:
providing an extrusion plate through the extrusion molding process to curve the extrusion plate in the first direction;
cutting the extrusion plate along the first direction to provide a plurality of chassis bars; and
coupling the plurality of chassis bars to each other.

16. The method of claim 15, wherein the extrusion plate is a second direction extruded plate, the second direction substantially perpendicular to the first direction.

17. The method of claim 15, wherein
the extrusion plate comprises first and second plate sides substantially parallel to a second direction substantially perpendicular to the first direction, and
the first and second plate sides comprise first and second coupling patterns, respectively.

18. The method of claim 14, wherein
the base plate comprises first and second sides facing each other and extending substantially parallel to the first direction, and
the bent-maintaining member comprises:
a first bent-maintaining member disposed adjacent to and coupled to the first side; and
a second bent-maintaining member disposed adjacent to and coupled to the second side.

19. The method of claim 18, wherein the base plate further comprises:
third and fourth sides extending substantially parallel to a second direction,
wherein the sidewall includes first and second sidewalls respectively extending upward from the third and fourth sides,
and
wherein the third and fourth sides connect the first and second sides to each other.

20. The method of claim 19, wherein both ends of each of the first and second bent-maintaining members are coupled to the first and second sidewalls, respectively.

21. A bottom chassis comprising:
a base plate which has a flexibility and a first rigidity, and is curved along a first direction; and
a first and a second bent-maintaining members which have a second rigidity greater than the first rigidity, are curved along the first direction, and are coupled to the base plate to maintain a curved shape of the base plate,
wherein the base plate comprises,
a bottom portion comprising first and second sides which face each other and extend substantially parallel to the first direction, and third and fourth sides which connect the first and the second sides; and
a first and a second side walls respectively extending upward from the third and fourth sides,
wherein each of the first and the second bent-maintaining members comprises,
a plurality of chassis bars connected to the first and the second sides to be arranged along the first and the second sides;
a first side chassis bar disposed on one side of each of the first and the second bent-maintaining members to be directly connected with the first side wall by a fixing member disposed in holes defined in the first side chassis bar and the first side wall of the base plate; and
a second side chassis bar disposed on the other side of each of the first and the second bent-maintaining members to be directly connected with the second side wall by a fixing member disposed in holes defined in the second side chassis bar and the second side wall of the base plate.

* * * * *